United States Patent
Abe et al.

(10) Patent No.: US 11,189,086 B2
(45) Date of Patent: Nov. 30, 2021

(54) OFFLINE TEACHING DEVICE, MEASUREMENT CONTROL DEVICE, AND PROGRAM

(71) Applicant: Mitutoyo Corporation, Kanagawa (JP)

(72) Inventors: Shinsaku Abe, Hokkaido (JP); Hideyuki Kusanagi, Hokkaido (JP)

(73) Assignee: MITUTOYO CORPORATION, Kawasaki (JP)

( * ) Notice: Subject to any disclaimer, the term of this patent is extended or adjusted under 35 U.S.C. 154(b) by 212 days.

(21) Appl. No.: 16/438,902

(22) Filed: Jun. 12, 2019

(65) Prior Publication Data

US 2020/0043226 A1  Feb. 6, 2020

(30) Foreign Application Priority Data

Jul. 31, 2018 (JP) .............................. JP2018-144535

(51) Int. Cl.
  *G06T 17/00* (2006.01)
  *G06T 7/70* (2017.01)
  *G01B 11/24* (2006.01)

(52) U.S. Cl.
  CPC .............. *G06T 17/00* (2013.01); *G01B 11/24* (2013.01); *G06T 7/70* (2017.01); *G06T 2200/04* (2013.01); *G06T 2200/24* (2013.01)

(58) Field of Classification Search
  CPC ....... G06T 17/00; G06T 7/70; G06T 2200/04; G06T 2200/24; G01B 11/24
  USPC ........................................................ 345/420
  See application file for complete search history.

(56) References Cited

U.S. PATENT DOCUMENTS

| 7,181,371 | B2 * | 2/2007 | Lindenbaum | ........... G06T 17/10 345/419 |
| 7,526,131 | B2 * | 4/2009 | Weber | ........... G06T 7/12 345/420 |
| 9,507,502 | B1 * | 11/2016 | Fox-Rabinovitz | ...... G06T 19/20 |
| 9,644,857 | B1 * | 5/2017 | Ashgriz | ........... F24F 11/30 |
| 10,363,705 | B1 * | 7/2019 | Marsch | ........... B33Y 50/00 |
| 10,474,763 | B2 * | 11/2019 | Santiquet | ........... G06F 30/00 |
| 10,812,778 | B1 * | 10/2020 | Wang | ........... G06T 7/20 |
| 2015/0097828 | A1 * | 4/2015 | Miller | ........... G06T 17/10 345/420 |

(Continued)

*Primary Examiner* — David T Welch
(74) *Attorney, Agent, or Firm* — Rankin, Hill & Clark LLP

(57) ABSTRACT

Provided are an offline teaching device and a measurement control device. The offline teaching device detects a shape of a measured object by a three-dimensional sensor unit, generates measurement procedure information in which measurement items are respectively associated with measurement points sequentially specified to the detected shape, and causes a measurement procedure information storage unit to store the measurement procedure information associated. The measurement control device detects a shape of a target measured object by a three-dimensional sensor unit, searches the measurement procedure information storage unit for a measured object having a shape substantially identical to a detected shape and specifies a measured object, extracts measurement procedure information on the specified measured object as measurement procedure information on the target measured object, and causes the use measuring device to measure the target measured object on the basis of the measurement procedure information extracted.

4 Claims, 4 Drawing Sheets

(56) References Cited

U.S. PATENT DOCUMENTS

| | | | |
|---|---|---|---|
| 2015/0233692 A1* | 8/2015 | Nakagawa | G01B 21/045 33/503 |
| 2016/0018218 A1* | 1/2016 | Nakagawa | G01B 5/008 33/503 |
| 2017/0270684 A1* | 9/2017 | Koga | G01B 21/30 |
| 2017/0327201 A1* | 11/2017 | Doyle | G01B 11/14 |
| 2018/0328729 A1* | 11/2018 | Turner | G01S 7/4813 |
| 2019/0154806 A1* | 5/2019 | Zweigle | G06T 7/0008 |

* cited by examiner

OFFLINE TEACHING DEVICE, MEASUREMENT CONTROL DEVICE, AND PROGRAM

TECHNICAL FIELD

The present invention relates to an offline teaching device, a measurement control device, and a program enabling automatic measurement easily by generating measurement procedure information with a simple operation and applying the measurement procedure information to a measuring device.

BACKGROUND ART

As a method for generating a part program in which a measurement procedure for realizing automatic measurement with a measuring device is described, there are online teaching and offline teaching. The online teaching is a method for generating a part program by describing, in a part program, a procedure in a case where an operator operates a measuring device to perform actual measurement of a measured object set in the measuring device. In the online teaching, since the measuring device cannot be used during teaching, there is a problem with measurement efficiency. Meanwhile, the offline teaching is a method for generating a part program by describing, in a part program, a simulation result obtained after measurement teaching simulation is performed on Computer Aided Design (CAD) data of a measured object by using offline teaching application software or the like. In the offline teaching, since teaching can be performed without using an actual device, measurement can be performed efficiently.

SUMMARY OF INVENTION

Technical Problem

A conventional teaching method requires a specialized technique such as an operating technique for a measuring device, an operating technique for application software, and a procedure generating technique. In addition, the conventional teaching method also requires a specialized technique such as a coordinate system setting technique when measurement is performed.

An object of the invention is to provide an offline teaching device, a measurement control device, and a program enabling automatic measurement easily by generating measurement procedure information with a simple operation and applying the measurement procedure information to a measuring device.

Solution to Problem

An offline teaching device according to an aspect of the invention includes a three-dimensional sensor unit configured to detect a position and a three-dimensional shape in a three-dimensional space of an object present within a detection range; a display unit configured to display, in a visible manner, a three-dimensional shape of a measured object detected by the three-dimensional sensor unit; an interface screen generation unit configured to generate an interface screen for receiving an input of measurement information including information specifying a measurement point in a three-dimensional shape of the measured object and information indicating a measurement content at the measurement point and configured to cause the display unit to display the interface screen together with the three-dimensional shape of the measured object; a measurement procedure information storage unit; and a write unit configured to write, to the measurement procedure information storage unit, measurement procedure information including the measurement information for each measurement point input sequentially via the interface screen by using a predetermined unit and information indicating input order for the measurement information for each measurement point together with information on the three-dimensional shape of the measured object.

A measurement control device according to an aspect of the invention includes a three-dimensional sensor unit configured to detect a position and a three-dimensional shape in a three-dimensional space of an object present within a detection range; a measurement procedure information storage unit configured to store in advance, for each of a plurality of measured objects, information on a three-dimensional shape of each of the plurality of measured objects and measurement procedure information including measurement information for each measurement point, including information specifying a measurement point in the three-dimensional shape and information indicating a measurement content at the measurement point, and information indicating input order for the measurement information for each measurement point; a measurement procedure information extraction unit configured to search the measurement procedure information storage unit for a three-dimensional shape detected by the three-dimensional sensor unit of a target measured object set in a use measuring device, configured to specify the measured object having a three-dimensional shape substantially identical to the three-dimensional shape of the target measured object, and configured to extract the measurement procedure information on the measured object specified from the measurement procedure information storage unit as measurement procedure information on the target measured object; a coordinate system setting unit configured to control the use measuring device to set a detection coordinate system in the three-dimensional sensor unit as a coordinate system of the use measuring device; and a control unit configured to cause the use measuring device to measure the target measured object on the basis of measurement procedure information on the target measured object.

The measurement control device may further include a measuring device information storage unit configured to store in advance configuration information on each of a plurality of models of measuring devices; a measuring device information extraction unit configured to search the measuring device information storage unit on the basis of information indicating a model of the use measuring device input with a predetermined unit and configured to extract configuration information on the use measuring device; and a reconfiguring unit configured to reconfigure measurement procedure information on the target measured object for the use measuring device on the basis of the configuration information on the use measuring device. In the measurement control device, the control unit may be configured to cause the use measuring device to measure the target measured object on the basis of measurement procedure information reconfigured for the use measuring device.

A function of each unit of the offline teaching device and the measurement control device of the invention may be realized by describing the function in a program and causing a computer to execute the program.

Advantageous Effects of Invention

According to an offline teaching device and a measurement control device of the invention, measurement procedure information is generated with a simple operation and applied to a measuring device to enable automatic measurement easily.

DESCRIPTION OF EMBODIMENTS

Figure 1:
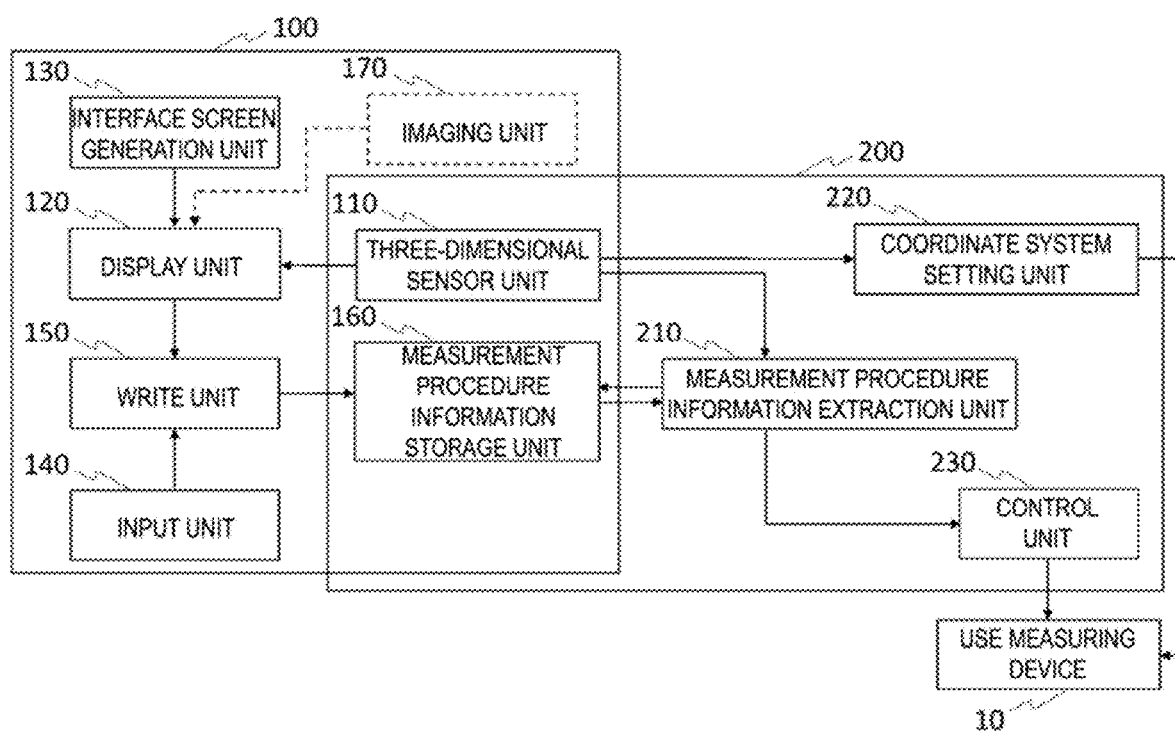
FIG. 1 is a functional block diagram of an offline teaching device 100 and a measurement control device 200 of the invention.

Embodiments of the invention will be described hereinafter with reference to the drawings. Note that in the following description and drawings, the same reference numerals are assigned to the same functional parts, and the description of the functional parts described once will be omitted or described as necessary.

First Embodiment

FIG. 1 is a functional block diagram of an offline teaching device 100 and a measurement control device 200 of the invention.

The offline teaching device 100 includes a three-dimensional sensor unit 110, a display unit 120, an interface screen generation unit 130, an input unit 140, a write unit 150, and a measurement procedure information storage unit 160.

The three-dimensional sensor unit 110 is a three-dimensional sensor configured to detect a position and a three-dimensional shape in a three-dimensional space of an object present within a detection range. The three-dimensional sensor unit 110 of any system may be used as long as the three-dimensional sensor unit 110 can detect the position and the three-dimensional shape in the three-dimensional space of the object present within the detection range.

The display unit 120 is of any system configured to display, in a visible manner, a three-dimensional shape of a measured object detected by the three-dimensional sensor unit 110. The configuration in which the three-dimensional shape of the measured object can be visible is any configuration. The three-dimensional shape itself may be displayed simply, or for example, an imaging unit 170 configured to capture an image of the measured object detected by the three-dimensional sensor unit 110 may further be provided, and the three-dimensional shape of the measured object can be made visible by displaying an image captured by the imaging unit 170. In addition, a transmission-type display may be used to make the measured object itself detected by the three-dimensional sensor unit 110 visible in a manner that the measured object is visible through the display.

The interface screen generation unit 130 is configured to generate an interface screen for receiving an input of measurement information including information specifying a measurement point in the three-dimensional shape of the measured object and information indicating a measurement content at the measurement point and configured to cause the display unit 120 to display the interface screen together with the three-dimensional shape of the measured object. Any interface screen and any method for displaying the interface screen may be employed.

Figure 2A:
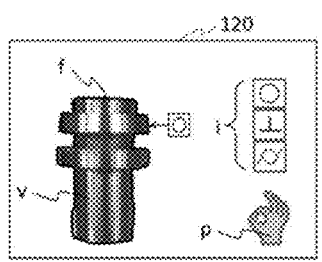
FIGS. 2A to 2D are views illustrating an example of an input interface screen and an example of an input method.

For example, as illustrated in FIG. 2A, the interface screen generation unit 130 causes the display unit 120 to display an icon group i indicating the measurement content side by side with a three-dimensional shape f of the measured object and/or an image v of the measured object. FIG. 2A exemplifies a case where the icon group i indicating the measurement content is displayed with symbols indicating roundness, squareness, and cylindricity, respectively.

The input unit 140 is any input unit corresponding to the interface screen displayed on the display unit 120 by the interface screen generation unit 130. For example, in the case of the input interface screen including the icon group exemplified in FIG. 2A, a mouse, a gesture detection unit, a touch panel display, or the like can be employed as an input unit.

Figure 2B:
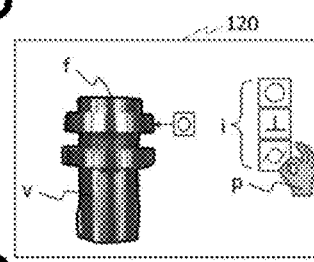
Figure 2C:
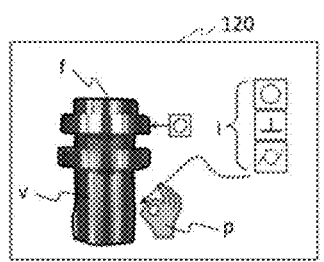
Figure 2D:
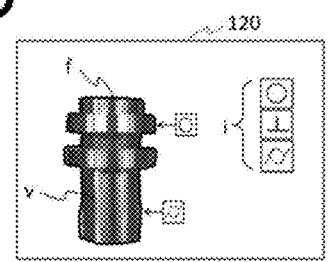

In the case of a mouse, a pointer p as illustrated in FIG. 2A is displayed, and the measurement content and the measurement point may be input by moving the pointer p onto an icon of a desired measurement content by user mouse operation as illustrated in FIG. 2B, dragging the icon as illustrated in FIG. 2C, and dropping the icon at a desired measurement point of the three-dimensional shape f of the measured object displayed side by side (FIG. 2D), for example. In addition, the measurement point at which the measurement content is executed may be input by moving the pointer p onto the icon of the desired measurement content, clicking the mouse to input the measurement content, and then moving the pointer p to the desired measurement point and clicking the mouse.

In the case of the gesture detection unit, the three-dimensional sensor unit 110, the display unit 120, and the imaging unit 170 are configured as follows, for example. While a measured object detected by the three-dimensional sensor unit 110 and an image of a hand of a user captured by the imaging unit 170 are made visible on the display unit 120, the icon group i is displayed side by side with the measured object, and instead of a mouse pointer, the hand of the user is operated to enable the measurement content and the measurement point to be input by an input operation such as drag-and-drop.

The gesture detection unit can be realized easily in a case where the offline teaching device 100 is configured by using a head-mounted display device that is a computer including a function unit corresponding to the three-dimensional sensor unit 110, the display unit 120, and the imaging unit 170, for example.

In the case of the touch panel display, the touch panel display may be employed as the display unit 120, and the measurement content and the measurement point may be input by touching an icon indicating the measurement content with a finger and dragging and dropping the icon at a desired measurement point of the three-dimensional shape f of the measured object displayed. In addition, the measurement point at which the measurement content is executed may be input by touching an icon indicating the measurement content with a finger to input the measurement content, and then touching a desired measurement point with a finger.

A user repeats the input operation from the input unit 140 as described above by the number of desired measurement points.

The write unit 150 is configured to write measurement procedure information including measurement information for each measurement point input sequentially from the input unit 140 via the interface screen and information indicating input order for the measurement information for each measurement point, to the measurement procedure information storage unit 160 together with information on the three-dimensional shape of the measured object.

The measurement procedure information storage unit 160 is a storage unit configured to store measurement procedure information output from the write unit 150. Any storage system or any type of storage unit may be employed as the measurement procedure information storage unit 160 as long as the measurement procedure information can be stored. In addition, the storage unit does not need to be provided in the body of the offline teaching device 100 or the measurement control device 200 and may be provided externally in a manner that the storage unit transmits and/or receives information via wired communication or wireless communication.

The measurement control device 200 includes the three-dimensional sensor unit 110, the measurement procedure information storage unit 160, a measurement procedure information extraction unit 210, a coordinate system setting unit 220, and a control unit 230.

The three-dimensional sensor unit 110 and the measurement procedure information storage unit 160 are functional units common to the three-dimensional sensor unit 110 and the measurement procedure information storage unit 160 of the offline teaching device 100, respectively. However, the measurement procedure information storage unit 160 is configured to store measurement procedure information for each of a plurality of measured objects. In addition, the three-dimensional sensor unit 110 may be provided separately in each of the offline teaching device 100 and the measurement control device 200.

The measurement procedure information extraction unit 210 is configured to search the measurement procedure information storage unit 160 for a three-dimensional shape detected by the three-dimensional sensor unit 110 of a target measured object set in a use measuring device 10, configured to specify a measured object having a three-dimensional shape substantially identical to the three-dimensional shape of the target measured object, and configured to extract the measurement procedure information on the measured object specified from the measurement procedure information storage unit 160 as measurement procedure information on the target measured object.

Accordingly, each measurement point (and the measurement content at each point) in the three-dimensional shape of the target measured object set in the use measuring device 10 is specified in a detection coordinate system in the three-dimensional sensor unit 110.

The coordinate system setting unit 220 is configured to control the use measuring device 10 to set the detection coordinate system in the three-dimensional sensor unit 110 as a coordinate system of the use measuring device 10. Specifically, the coordinate system setting unit 220 controls the use measuring device 10 and causes the use measuring device 10 to execute a measurement function provided in the use measuring device 10 for setting a coordinate system on the target measured object.

The control unit 230 is configured to cause the use measuring device 10 to measure the target measured object on the basis of the measurement procedure information on the target measured object.

According to the offline teaching device 100 and the measurement control device 200 of the invention described above, automatic measurement can be performed easily by generating measurement procedure information with a simple operation and applying the measurement procedure information to a measuring device.

Second Embodiment

Assuming that a plurality of models of measuring devices are used, since a specific configuration of a measuring device differs for each model of a measuring device, a measurement procedure may desirably be reconfigured in a manner suitable for a model of a measuring device. A second embodiment is an embodiment enabling automatic measurement even in such a case. The second embodiment is realized by a combination of the offline teaching device 100 similar to the offline teaching device of the first embodiment and a measurement control device 201 in which several components are added to the measurement control device 200 of the first embodiment.

Figure 3:
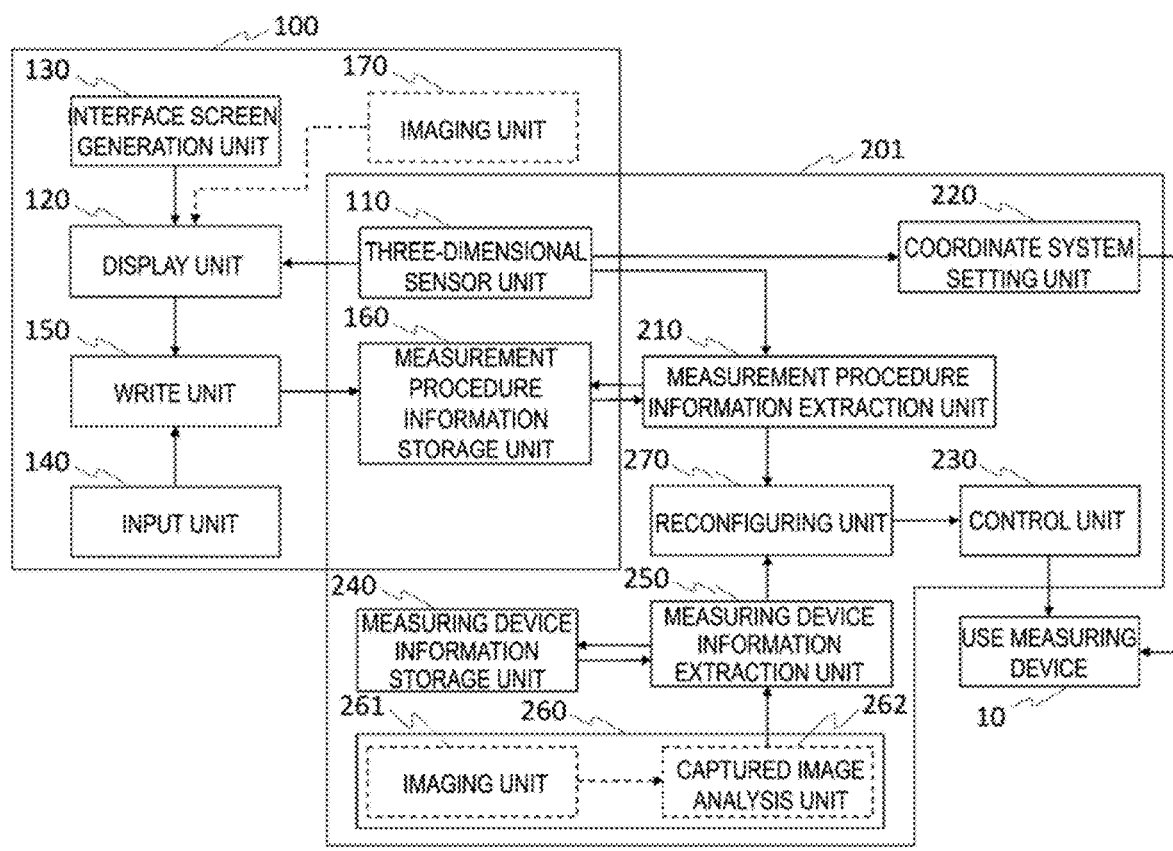
FIG. 3 is a functional block diagram of an offline teaching device 100 and a measurement control device 201 of the invention.

FIG. 3 is a functional block diagram of the offline teaching device 100 and the measurement control device 201.

The measurement control device 201 includes the three-dimensional sensor unit 110, the measurement procedure information storage unit 160, the measurement procedure information extraction unit 210, the coordinate system setting unit 220, the control unit 230, a measuring device information storage unit 240, a measuring device information extraction unit 250, an input unit 260, and a reconfiguring unit 270. That is, the measurement control device 201 includes a configuration in which the measurement control device 200 of the first embodiment further includes the measuring device information storage unit 240, the measuring device information extraction unit 250, the input unit 260, and the reconfiguring unit 270.

The measuring device information storage unit 240 is a storage unit configured to store configuration information on each of a plurality of models of measuring devices in advance. The configuration information is any information, and examples of the configuration information include a measurable range of a measuring device, a type of probe head or probe mounted, an angle of a registered probe, and information on a probe changer, a stylus changer, or the like. Any storage system or any type of storage unit may be employed as the measuring device information storage unit 240 as long as the configuration information can be stored. In addition, the storage unit does not need to be provided in a body of the offline teaching device 100 or the measurement control device 201 and may be provided externally in a manner that the storage unit transmits and/or receives information via wired communication or wireless communication.

The measuring device information extraction unit 250 is configured to search the measuring device information storage unit 240 on the basis of information indicating a model of the use measuring device 10 input with a predetermined unit and to extract configuration information on the use measuring device 10 from among a plurality of pieces of configuration information on a plurality of models of measuring devices.

The input unit 260 from which information indicating a model of the use measuring device 10 is input is of any form. A keyboard, a mouse, and the like are employed in a case where an input interface screen is displayed on the display unit 120 shared with the offline teaching device 100 or a display unit (not illustrated) provided individually in the measurement control device 201, and information is input via the input interface screen, for example.

In addition, the input unit 260 may include an imaging unit 261 and a captured image analysis unit 262. The imaging unit 261 may capture an image of an appearance of the use measuring device 10, a plate on which a model number is shown, or the like, and the captured image analysis unit 262 may search for a model of the use measuring device 10 or read the model number of the use measuring device 10 on the basis of the captured image to specify the model of the use measuring device 10, and the specified model of the use measuring device 10 is input to the measuring device information extraction unit 250, for example.

The reconfiguring unit 270 is configured to reconfigure measurement procedure information on the target measured object extracted by the measurement procedure information extraction unit 210 into a measurement procedure suitable for the use measuring device on the basis of the configuration information on the use measuring device 10 extracted by the measuring device information extraction unit 250.

The control unit 230 is configured to cause the use measuring device 10 to perform the measurement on the basis of the measurement procedure information reconfigured for the use measuring device by the reconfiguring unit 270.

Accordingly, the measurement procedure information generated by the offline teaching device 100 can be reconfigured automatically depending on a model of a measuring device, and measurement can be performed.

Third Embodiment

A function of each unit of the offline teaching device 100, the measurement control device 200, and the measurement control device 201 of the invention may be realized by describing the function in a program and causing a computer to execute the program.

Figure 4:
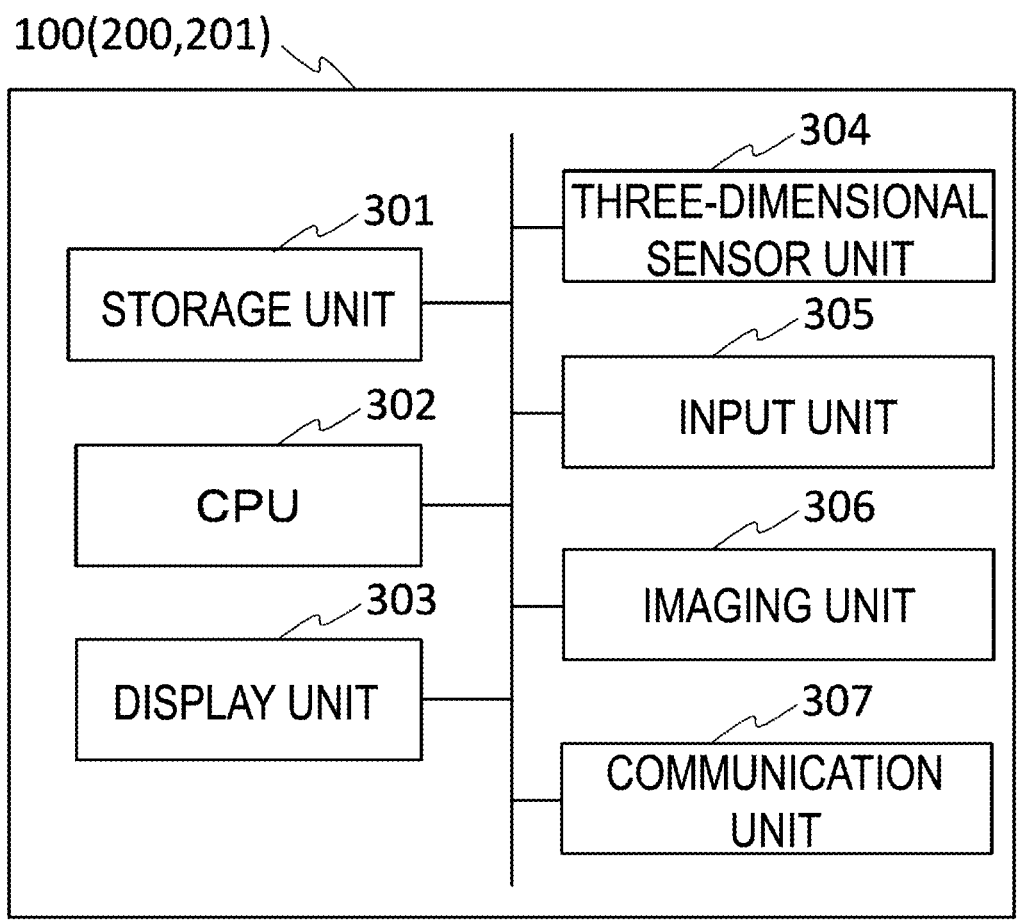
FIG. 4 is a diagram illustrating an example of a configuration of an offline teaching device 100, a measurement control device 200, and a measurement control device 201 of the invention in a case where a function of each unit is realized by causing a CPU to execute a program in which the function of each unit is described.

FIG. 4 is a diagram illustrating an example of a configuration of the offline teaching device 100, the measurement control device 200, and the measurement control device 201 in a case where a function of each unit is realized by describing the function in a program and causing a computer to execute the program.

The offline teaching device 100, the measurement control device 200, and the measurement control device 201 each include a storage unit 301, a CPU 302, a display unit 303, a three-dimensional sensor unit 304, an input unit 305, an imaging unit 306, and a communication unit 307, for example.

The storage unit 301 functions as the measurement procedure information storage unit 160 and the measuring device information storage unit 240 and is also configured to store a program in which the function of each unit of the offline teaching device 100, the measurement control device 200, and the measurement control device 201 is described. In addition to a storage medium such as an HDD and a flash memory, a non-volatile memory, a volatile memory, or the like can be employed as the storage unit 301, for example. One storage unit 301 may be provided, or a plurality of the storage units 301 may be provided depending on items to be stored or the like.

The CPU 302 executes the program read from the storage unit 301 to realize the function of each unit of the offline teaching device 100, the measurement control device 200, and the measurement control device 201.

The display unit 303 is of any system configured to function as a display unit 120.

The three-dimensional sensor unit 304 is a three-dimensional sensor configured to function as a three-dimensional sensor unit 110.

The input unit 305 is an input unit such as a mouse or a keyboard configured to function as the input unit 140 and the input unit 260.

The imaging unit 306 is of any system configured to function as the imaging unit 170 and the imaging unit 261.

The communication unit 307 is an interface for connection with a wireless network or a wired network and transmits and/or receives information to/from the use measuring device 10 or a cloud storage connected with a network under control of the CPU 302.

The invention is not limited to the embodiments described above. Each embodiment is exemplary, and an embodiment including a configuration substantially identical to the technical ideas set forth in the claims of the invention and exhibiting similar effects is encompassed by the technical scope of the invention. That is, changes can be made appropriately within the scope of the technical ideas expressed in the invention, and forms in which such changes and modifications are added are also encompassed by the technical scope of the invention.

REFERENCE SIGNS LIST

10 Use measuring device
100 Offline teaching device
110, 304 Three-dimensional sensor unit
120, 303 Display unit
130 Interface screen generation unit
140, 260, 305 Input unit
150 Write unit
160 Measurement procedure information storage unit
170, 261, 306 Imaging unit
200, 201 Measurement control device
210 Measurement procedure information extraction unit
220 Coordinate system setting unit
230 Control unit
240 Measuring device information storage unit
250 Measuring device information extraction unit
262 Captured image analysis unit
270 Reconfiguring unit
301 Storage unit
302 CPU
307 Communication unit
f Three-dimensional shape of measured object
i Icon group
p Pointer
v Image of measured object

The invention claimed is:

1. A measurement control device comprising:
a three-dimensional sensor unit configured to detect a position and a three-dimensional shape in a three-dimensional space of an object present within a detection range;
a measurement procedure information storage unit configured to store in advance, for each of a plurality of objects, information on a three-dimensional shape of each of the plurality of objects and measurement procedure information including measurement information for each of a plurality of measurement points and information indicating input order for the measurement information for each of the plurality of measurement points, the measurement information for each of the plurality of measurement points including information specifying each of the plurality of measurement points in the three-dimensional shape and information indicating a measurement content at the each of the plurality of measurement points;

a measurement procedure information extraction unit configured to search the measurement procedure information storage unit to specify one of the plurality of objects which has the three-dimensional shape substantially identical to a three-dimensional shape of a target object in a measuring device in use based on the three-dimensional shape of the target object detected by the three-dimensional sensor unit, and the measurement procedure information extraction unit being configured to extract the measurement procedure information on the specified object from the measurement procedure information storage unit as the measurement procedure information on the target object, a coordinate system setting unit configured to control the measuring device in use to set a detection coordinate system in the three-dimensional sensor unit as a coordinate system of the measuring device in use; and a control unit configured to cause the measuring device in use to measure the target object on the basis of the measurement procedure information on the target object.

2. The measurement control device according to claim 1 further comprising:

a measuring device information storage unit configured to store in advance configuration information on each of a plurality of models of measuring devices;

a measuring device information extraction unit configured to search the measuring device information storage unit and extract the configuration information on the measuring device in use from the measuring device information storage unit on the basis of model information indicating a model of the measuring device in use, the model information being input with an input unit; and a reconfiguring unit configured to reconfigure the measurement procedure information on the target object for the measuring device in use on the basis of the extracted configuration information on the measuring device in use, wherein the control unit is configured to cause the measuring device in use to measure the target object on the basis of the measurement procedure information reconfigured for the measuring device in use.

3. A non-volatile memory storing a program for causing a computer to function as each unit of the measurement control device according to claim 1.

4. The measurement control device according to claim 1, wherein the control unit is configured to cause the measuring device in use to measure the target object in an order according to the input order for the measurement information for each of the plurality of measurement points, which is included in the measurement procedure information on the target object.

* * * * *